United States Patent
Desmouceaux et al.

(10) Patent No.: US 10,862,857 B2
(45) Date of Patent: Dec. 8, 2020

(54) SYSTEM AND METHOD OF USING A GLOBAL DISCOVERY SERVICE TO ENABLE ROUTING OF PACKETS FROM A SOURCE CONTAINER TO A DESTINATION CONTAINER

(71) Applicant: Cisco Technology, Inc., San Jose, CA (US)

(72) Inventors: Yoann Desmouceaux, Paris (FR); Marcel Paul Sosthène Enguehard, Paris (FR); Jacques Olivier Samain, Paris (FR); Jerome Tollet, Paris (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 29 days.

(21) Appl. No.: 16/366,466

(22) Filed: Mar. 27, 2019

(65) Prior Publication Data

US 2020/0314056 A1 Oct. 1, 2020

(51) Int. Cl.
| | |
|---|---|
| *G06F 15/177* | (2006.01) |
| *H04L 29/12* | (2006.01) |
| *H04L 29/08* | (2006.01) |
| *H04L 12/24* | (2006.01) |
| *H04L 12/721* | (2013.01) |
| *H04L 12/741* | (2013.01) |

(52) U.S. Cl.
CPC ...... *H04L 61/1541* (2013.01); *H04L 41/0816* (2013.01); *H04L 45/72* (2013.01); *H04L 45/745* (2013.01); *H04L 67/16* (2013.01)

(58) Field of Classification Search
CPC ... H04L 45/72; H04L 45/745; H04L 61/1541; H04L 67/16; H04L 41/0816

USPC .................................................. 709/203, 221
See application file for complete search history.

(56) References Cited

U.S. PATENT DOCUMENTS

| | | | |
|---|---|---|---|
| 9,407,359 B2 | 8/2016 | Swinkels et al. | |
| 9,967,141 B2 | 5/2018 | Narain et al. | |
| 2014/0328343 A1* | 11/2014 | Kapadia | H04L 45/741 370/392 |
| 2016/0315819 A1 | 10/2016 | Dara et al. | |
| 2017/0250908 A1 | 8/2017 | Nainar et al. | |
| 2018/0293538 A1* | 10/2018 | Berger | H04W 60/00 |

OTHER PUBLICATIONS

De Graaff, Ben, "Segment Routing in Container Networks," Jul. 12, 2017, pp. 1-28.

\* cited by examiner

*Primary Examiner* — Frantz B Jean
(74) *Attorney, Agent, or Firm* — Polsinelli PC

(57) ABSTRACT

Systems, methods, and computer-readable storage media are provided to populate databases with routing data for containers to eliminate the need for continuously accessing a global discovery service. An example method includes initiating, from a source container operating on a first machine in a first rack, a communication with a destination container operating on a second machine on a second rack, wherein a local database on the first machine does not know an address of the destination container. The method includes accessing a global discovery service to provide the address of the destination container, populating the local database on the first machine with the address of the destination container and routing a packet from the source container to the destination container according to the address of the destination container.

20 Claims, 7 Drawing Sheets

SYSTEM AND METHOD OF USING A GLOBAL DISCOVERY SERVICE TO ENABLE ROUTING OF PACKETS FROM A SOURCE CONTAINER TO A DESTINATION CONTAINER

TECHNICAL FIELD

The present technology pertains service discovery and more specifically to using segment routing to search for a service in a tree-based architecture and without relying on out-of-band mechanisms but directly at the network layer.

BACKGROUND

In container networks, such as those orchestrated by Kubernetes, service discovery is a key feature to enable two-way communication between micro-services. Microservices are modular, distributed software components that can be deployed in the cloud or a computer network environment. The service discovery functionality is usually provided by means of (i) a manual configuration or (ii) using a centralized, out-of-band dictionary (usually, a domain name system (DNS) server). Therefore, service discovery entails either a configuration burden, or network latency. For example, for DNS-based discovery, a full network round-trip time (RTT) corresponding to the DNS transaction must elapse before actual communication can be established.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Figure 1A:
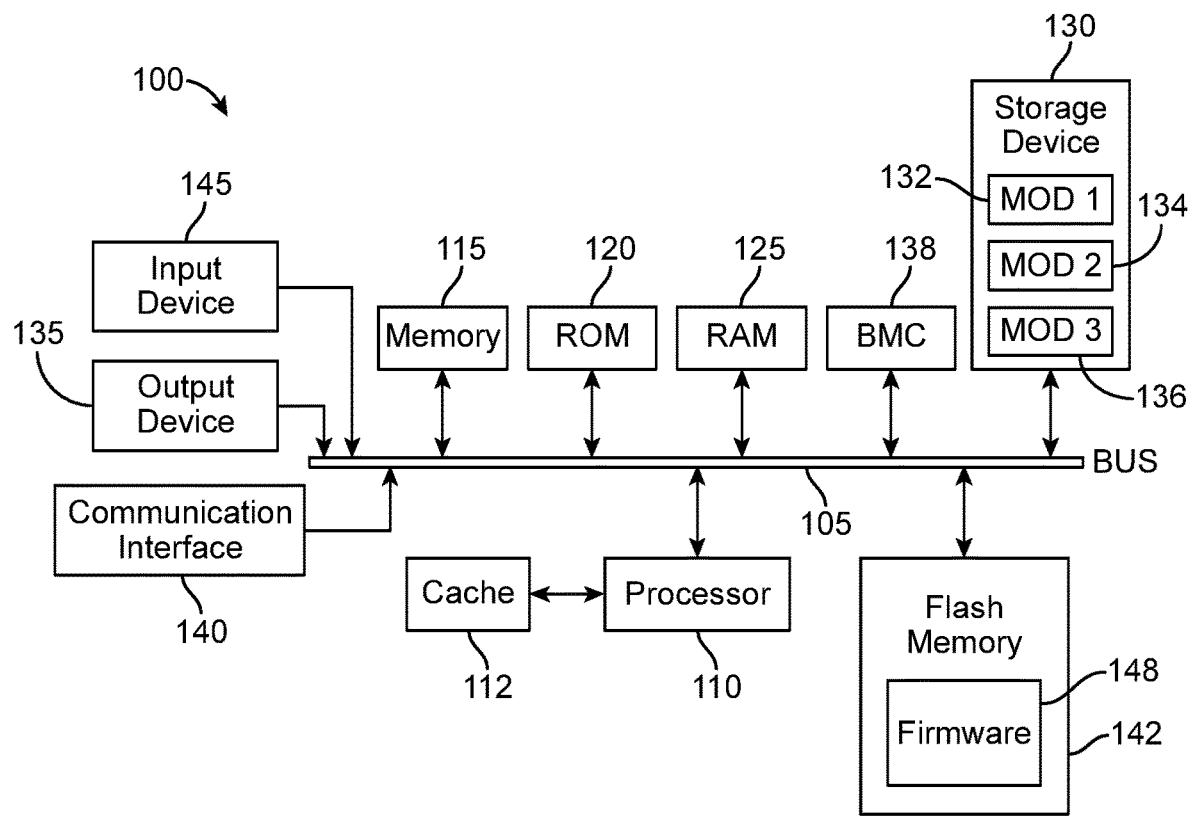
FIGS. 1A and 1B illustrate example system embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Containers a simplified version of virtual machines such as those created with the known VMware environments. Containers can include minimal operating systems such as Linux, CoreOS or a Windows Server system Nano Server. To work, however, container systems need networking functionality to connect to other application across the network or cloud. A container can be generated from a prepared image gathered from a designated registry, such as Docker Hub or another private registry. The image can be characterized as a snapshot of just the software needed to run a particular workload, along with only the software it depends upon to function and nothing else. When the system instantiates the container, it assigns a unique network address to it, connecting it to a virtual Ethernet bridge, which in the case of Docker is called docker0. All containers in the system communicate with each other by directing packets to docker0, which then forwards those packets through the subnet automatically. CoreOS's container runtime, called Rocket or rkt, handles networking in a very similar fashion. A Layer 3 router may be used to direct all container-bound traffic to a default gateway that is managed entirely by the container runtime system, bypassing the conventional Layer 2 switch.

The containerized software system can be used to build new types of applications, constructed of microservices connected to one another using network virtualization. A conventional application inhabits the addressable memory space of a processor or set of processor cores. There, the operating system facilitates communication through a sophisticated, but often slow and tedious, procedure. With microservices, each container behaves as though it were its own Internet site, complete with its own Web server. So containers can address each other's workloads through API calls, which are parsed by a DNS server designated by the container daemon. Container orchestration systems such as Google's Kubernetes and Apache Mesos are effectively networked operations centers, applied to the task of managing container subnets.

Given the advent of network agents for container runtimes (Istio, Envoy), providing service discovery as a network service rather than an out-of-band feature is valuable for providing a unified container infrastructure and will also provide latency benefits. The disclosed approaches can return the return trip time and eliminate some of the need to access databases storing IP addresses related to services.

Disclosed are systems, methods, and non-transitory computer-readable storage media for using IPv6 Segment Routing (SRv6) to provide in-band, transparent service discovery in container networks. The idea is to replicate a tree-based recursive DNS architecture, but directly at the network layer, by augmenting connection establishment packets (e.g., TCP SYNs and SYN-ACKs) with Segment IDentifiers (SIDS) tailored for service discovery.

A brief introductory description of example systems and methods is provided. A method of providing in-band container discovery includes (1) in a machine, configuring, via a processor, a network agent with a first address s1, a second address s2, and a third address s3, (2) upon starting a container hosted by the machine, provisioning a global database at the third address s3 with an entry mapping v→p in which v is a virtual IP address (VIP) of the container and p is a physical IP address (PIP) of the machine hosting the container, (3) in a packet destined to the VIP of the container, applying, by the network agent, a header containing a segment list (s1, s2, s3, 0::0, v), (4) upon the packet reaching s1, performing a lookup associated with v and if there is a match p as a physical address for the service identified by the VIP, a segment 4 s4 of the segment list is replaced by p, wherein the segment list becomes (s1, s2, s3, p, v), (5) upon the packet reaching s2, applying step (4) and if no match exists, forwarding the packet to s3 in the segment list, (6) upon reaching s3, applying step (4) and forwarding the packet to the s4, and (7) transmitting, to s2 and then to s1, the packet containing a segment routing list (s2, s1, p, v) with no payload, instructing s2 and s1 to install the entry mapping the VIP of the container to the PIP of the machine hosting the container. Upon reaching the PIP, the method can include delivering the packed to the container serving the VIP by the network agent.

The first address s1 can be for a local discovery service corresponding to each machine, the second address s2 can be associated with a rack-local service corresponding to each machine and the third address s3 can correspond to a global discover service. The method allows lookups by containers from a same machine or same rack to be achieved without going to the global discovery service. In another aspect, the method reduces latency relative to a method requiring access to a global discovery service.

DETAILED DESCRIPTION

Figure 1B:
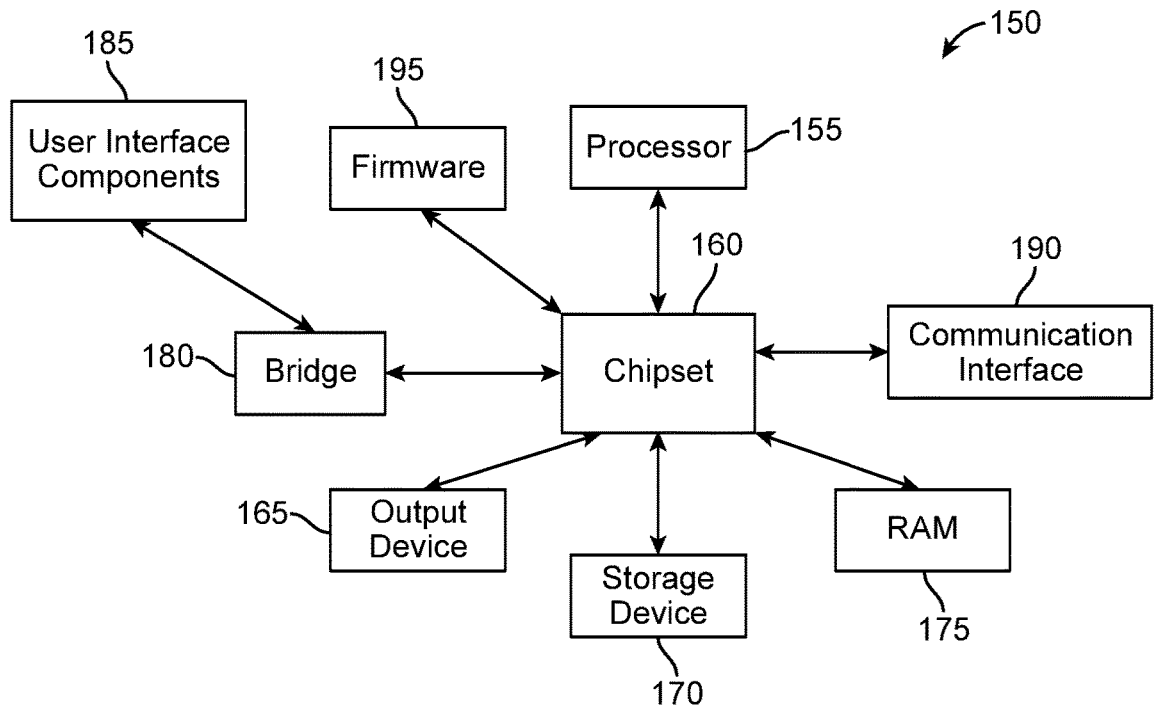

FIGS. 1A and 1B illustrate example system embodiments. The more appropriate embodiment will be apparent to those of ordinary skill in the art when practicing the present technology. Persons of ordinary skill in the art will also readily appreciate that other system embodiments are possible.

FIG. 1A illustrates a system bus computing system architecture 100 wherein the components of the system are in electrical communication with each other using a bus 105. Example system 100 includes a processing unit (CPU or processor) 110 and a system bus 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules can control or be configured to control the processor 110 to perform various actions. Other system memory 115 may be available for use as well. The memory 115 can include multiple different types of memory with different performance characteristics. The processor 110 can include any general purpose processor and a hardware module or software module, such as module 1 132, module 2 134, and module 3 136 stored in storage device 130, configured to control the processor 110 as well as a special-purpose processor where software instructions are incorporated into the actual processor design. The processor 110, 155, 210 may essentially be a completely self-contained computing system, containing multiple cores or processors, a bus, memory controller, cache, etc. A multi-core processor may be symmetric or asymmetric.

To enable user interaction with the computing device 100, an input device 145 can represent any number of input mechanisms, such as a microphone for speech, touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include software modules 132, 134, 136 for controlling the processor 110. Other hardware or software modules are contemplated. The storage device 130 can be connected to the system bus 105. In one aspect, a hardware module that performs a particular function can include the software component stored in a computer-readable medium in connection with the necessary hardware components, such as the processor 110, bus 105, display 135, and so forth, to carry out the function.

The BMC (baseboard management controller) 138 can be a specialized microcontroller or processor on the system 100. In some cases, the BMC 138 can be part of an Intelligent Platform Management Interface (IPMI). Moreover, in some cases, the BMC 138 can be embedded on a motherboard or main circuit board of the system 100. The BMC 138 can manage the interface between system management software and platform hardware. Different types of sensors built into the system 100 can report to the BMC 138 on parameters such as temperature, cooling fan speeds, power status, operating system (OS) status, and so forth. The BMC 138 can monitor the sensors and send alerts to an administrator via a network interface, such as communication interface 140, if any of the parameters do not stay within preset limits or thresholds, indicating a potential failure or error of the system 100. The administrator can also remotely communicate with the BMC 138 to take some corrective action, such as resetting or power cycling the system 100 to restore functionality.

Flash memory 142 can be an electronic non-volatile computer storage medium or chip which can be used by the system 100 for storage and/or data transfer. The flash memory 142 can be electrically erased and/or reprogrammed. Flash memory 142 can include, for example, erasable programmable read-only memory (EPROM), electrically erasable programmable read-only memory (EEPROM), ROM, NVRAM, or complementary metal-oxide semiconductor (CMOS). The flash memory 142 can store the firmware 148 executed by the system 100 when the system 100 is first powered on, along with a set of configurations specified for the firmware 148. The flash memory 142 can also store configurations used by the firmware 148.

The firmware 148 can include a Basic Input/Output System or its successors or equivalents, such as an Extensible Firmware Interface (EFI) or Unified Extensible Firmware Interface (UEFI). The firmware 148 can be loaded and executed as a sequence program each time the system 100 is started. The firmware 148 can recognize, initialize, and test hardware present in the system 100 based on the set of configurations. The firmware 148 can perform a self-test, such as a Power-on-Self-Test (POST), on the system 100. This self-test can test functionality of various hardware components such as hard disk drives, optical reading devices, cooling devices, memory modules, expansion cards and the like. The firmware 148 can address and allocate an area in the memory 115, ROM 120, RAM 125, and/or storage device 130, to store an operating system (OS). The firmware 148 can load a boot loader and/or OS, and give control of the system 100 to the OS.

The firmware 148 of the system 100 can include a firmware configuration that defines how the firmware 148 controls various hardware components in the system 100. The firmware configuration can determine the order in which the various hardware components in the system 100 are started. The firmware 148 can provide an interface, such as an UEFI, that allows a variety of different parameters to be set, which can be different from parameters in a firmware default configuration. For example, a user (e.g., an administrator) can use the firmware 148 to specify clock and bus speeds, define what peripherals are attached to the system 100, set monitoring of health (e.g., fan speeds and CPU temperature limits), and/or provide a variety of other parameters that affect overall performance and power usage of the system 100.

While firmware 148 is illustrated as being stored in the flash memory 142, one of ordinary skill in the art will readily recognize that the firmware 148 can be stored in other memory components, such as memory 115 or ROM 120, for example. However, firmware 148 is illustrated as being stored in the flash memory 142 as a non-limiting example for explanation purposes.

FIG. 1B illustrates an example computer system 150 having a chipset architecture that can be used in executing the described method(s) or operations, and generating and displaying a graphical user interface (GUI). Computer system 150 can include computer hardware, software, and firmware that can be used to implement the disclosed technology. System 150 can include a processor 155, representative of any number of physically and/or logically distinct resources capable of executing software, firmware, and hardware configured to perform identified computations. Processor 155 can communicate with a chipset 160 that can control input to and output from processor 155. In this example, chipset 160 outputs information to output device 165, such as a display, and can read and write information to storage device 170, which can include magnetic media, and solid state media, for example. Chipset 160 can also read data from and write data to RAM 175. A bridge 180 for interfacing with a variety of user interface components 185 can be provided for interfacing with chipset 160. Such user interface components 185 can include a keyboard, a microphone, touch detection and processing circuitry, a pointing device, such as a mouse, and so on. In general, inputs to system 150 can come from any of a variety of sources, machine generated and/or human generated.

Chipset 160 can also interface with one or more communication interfaces 190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 155 analyzing data stored in storage 170 or 175. Further, the machine can receive inputs from a user via user interface components 185 and execute appropriate functions, such as browsing functions by interpreting these inputs using processor 155.

Moreover, chipset 160 can also communicate with firmware 195, which can be executed by the computer system 150 when powering on. The firmware 195 can recognize, initialize, and test hardware present in the computer system 150 based on a set of firmware configurations. The firmware 195 can perform a self-test, such as a POST, on the system 150. The self-test can test functionality of the various hardware components 155-190. The firmware 195 can address and allocate an area in the memory 175 to store an OS. The firmware 195 can load a boot loader and/or OS, and give control of the system 150 to the OS. In some cases, the firmware 195 can communicate with the hardware components 155-190. Here, the firmware 195 can communicate with the hardware components 155 and 165-190 through the chipset 160 and/or through one or more other components. In some cases, the firmware 195 can communicate directly with the hardware components 155-190.

It can be appreciated that example systems 100 and 150 can have more than one processor 110 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, servers, network devices, and so forth. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described herein.

Figure 2:
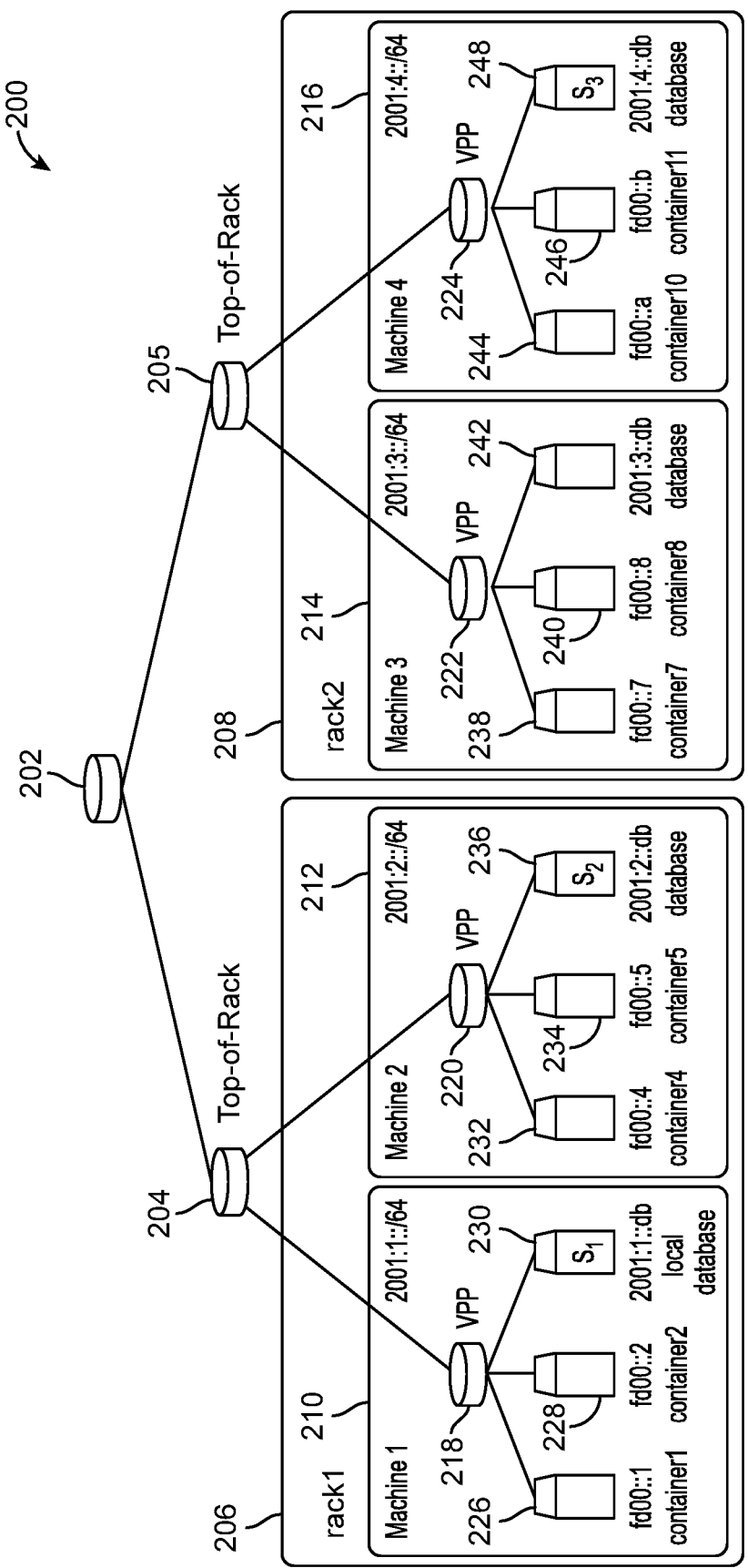
FIG. 2 illustrates a block diagram of an example environment applicable to service discovery.

To more fully understand the process disclosed herein, FIG. 2 provides an example network of compute nodes which illustrates the point. Consider the network 200 with two racks 206 and 208 each comprising two machines (respectively machines 210, 212, 214 and 216). Top-of-rack routers 204, 205 and a global router 202 enable communication between the different racks in a tree structure.

In this example, the disclosure will focus on machine1 210 in rack1 206 and its local database "s1" (230) which is configured on machine1. The rack-local database "s2" (236) is configured on machine2 212 and a global database (s3) 248 or global discovery service is configured on machine4 216 on rack2 (208). The local database 230 has an address of 2001:1::db and a rack-local database 236 has an address of 2001:2::db. The global database 248 has an address of 2001:4::db and is configured on machine4 216 in rack2 208.

Assume that container1 226 on machine1 210 wants to reach container7 238 on machine3 214. Initially, the local and rack-local databases 230, 236 do not know about the location of the container7 238 on machine3 214 on rack2 208. Thus, a packet routed from container1 226 needing to find container7 238 follows a segment routing path s1→s2→s3.

Also shown in FIG. 2 are other containers such as container2 228, container4 232, container5 234, container8 240, container10 244 and container11 246. Database 242 is configured on machine3 214 on rack2 208. That database has an address of 2001:3::db. Each container, as is shown in FIG. 2, has its own address.

Figure 3:
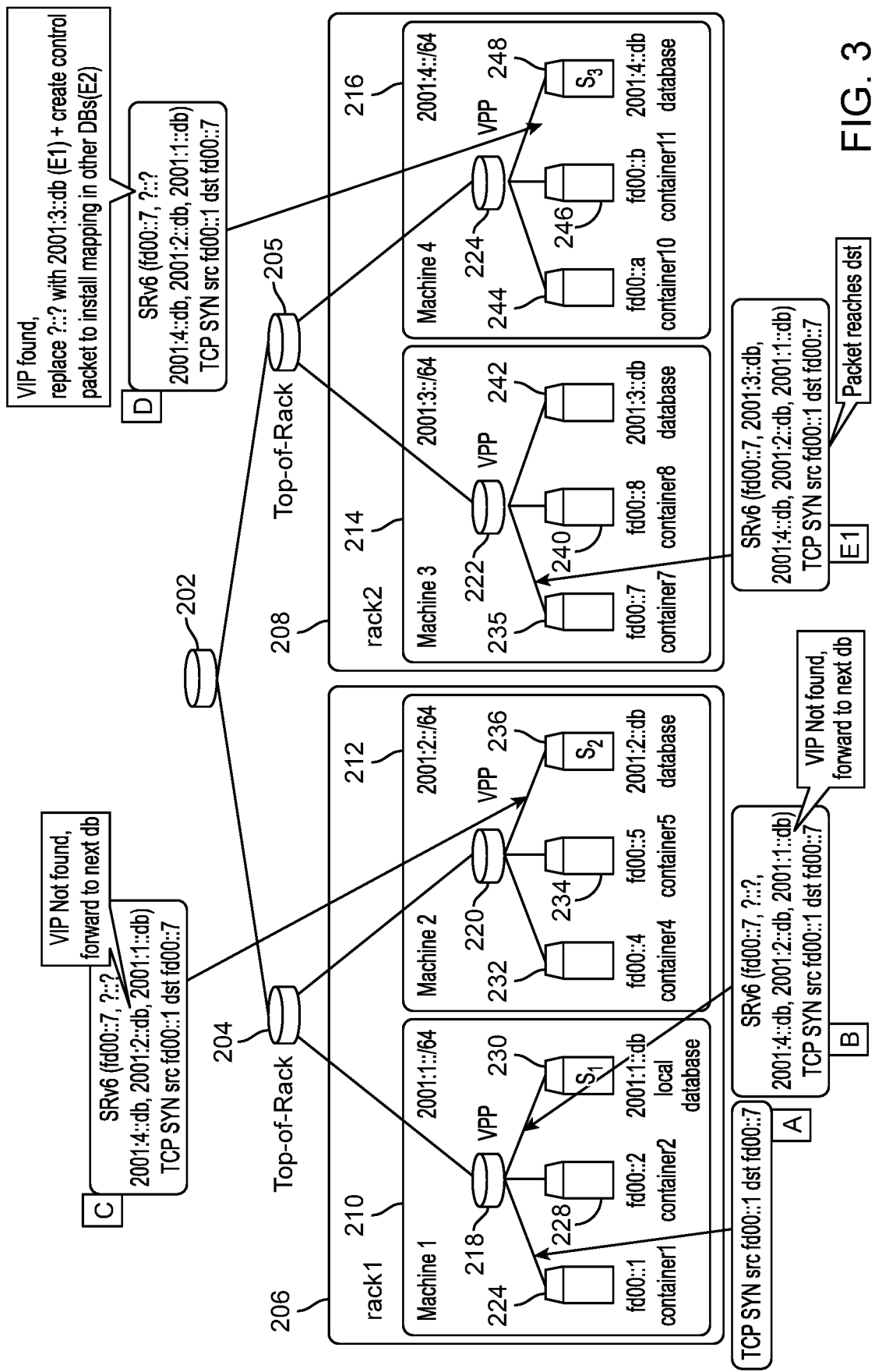
FIG. 3 illustrates an example process of one container in the network seeking to contact another container.

FIG. 3 illustrates the process disclosed herein for providing a network path to a local database to reduce the number of times the segment routing needs to access a database for communication between containers. The process described in FIG. 3 addresses a scenario where container1 226 wants to contact container7 238 and thus issues a TCP SYN packed with addresses fd00::2→fd00::7. At step A in FIG. 3, a TCP SYN SFC step identifies fd00::1 as the source container address and the destination address as fd00::7. The TCP SYN SFC step is a three way handshake in the Transmission Control Protocol (TCP) and includes a "synchronize" component and is in the context of a service function chain (SFC). SFCs ensure a fair distribution of network resources according to service policies and can enhance the performance of service delivery or even manage security and privacy.

At step B, the process accesses the local database 230 for the destination address but does not find the address for fd00::7. The process indicates that the next database (2001:2::db 236) should be checked. At step C in FIG. 3, the database at 2001:2::db (the rack-local database 236) is checked for the VIP address of fd00::7, but it is not found. The next database to be checked, as shown in step D, is the global database 248 at 2001:4::db. Here, the VIP is found and the algorithm replaces "?::?" with 2001:3::db (step E1) and creates a control packet to install a mapping in the other databases in step E2 shown in FIG. 4. The global database 248 at s3 finally knows about the location of the desired container and directs the packet to machine3 214. Step E2 provides the identification of the proper database 242 at address 2001:3::db associated with or on the same machine as container7 238. Step E2 can also include installing the mapping in the rack-local database at address 2001:2::db. The database or segment s3 (248) can perform a function to improve the segment routing by creating an empty packet and sending it with segment routing to s2 (236) followed by s1 (230), with instructions to install a mapping of container7 on machine3 in each of those databases.

Figure 4:
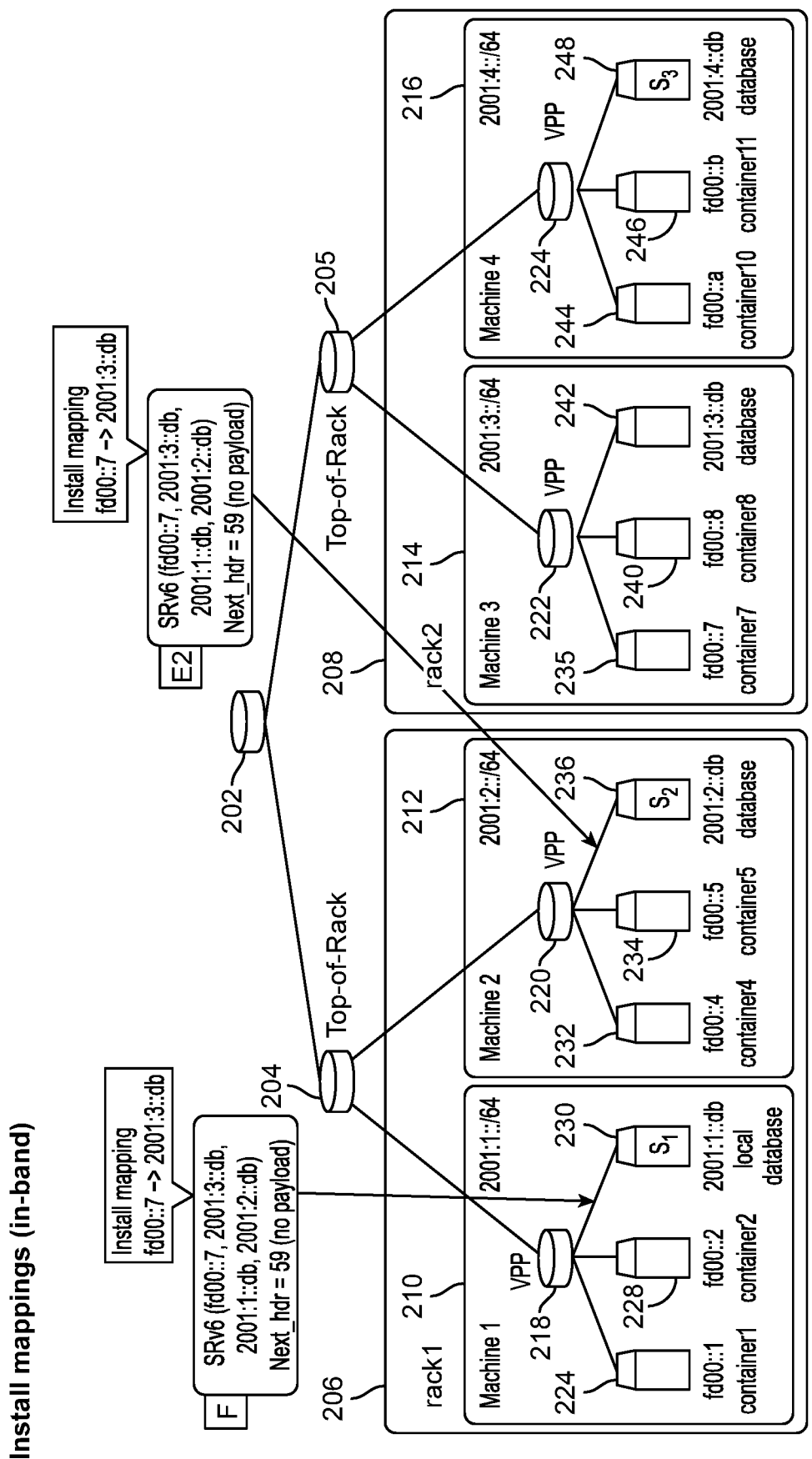
FIG. 4 illustrates in-band install mappings according to this disclosure.
Figure 5:
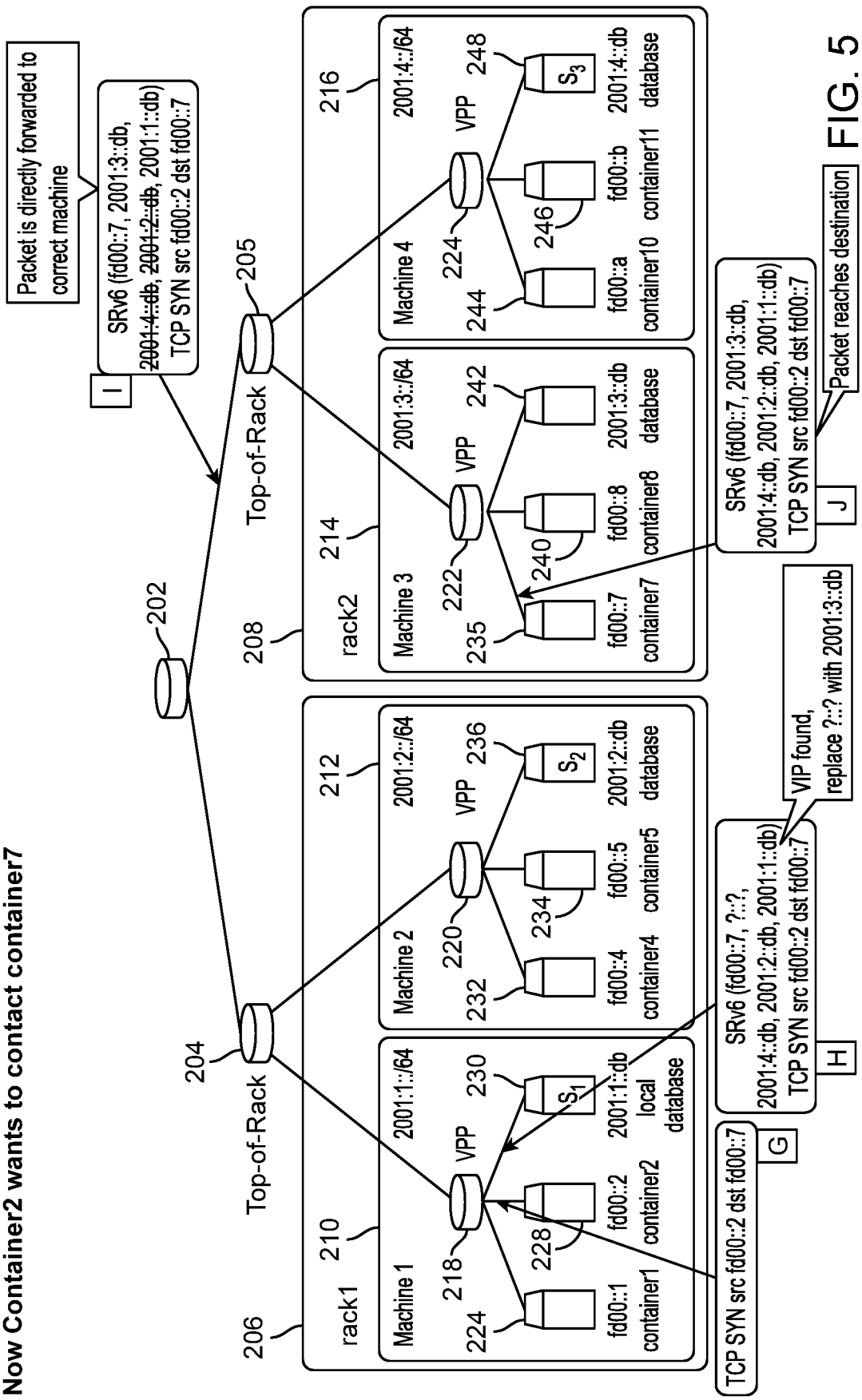
FIG. 5 illustrates another container wanting to contact a container in a way to leverage previously-installed mappings.

As shown in FIG. 4, step F involves mapping the database 2001:3::db (242) to container7 238 by also installing the mapping in the 2001:1::db (230) local database. FIG. 5 illustrates another part of the process with step G. The process references the origination node fd00::2 and the destination fd00::7 and step H includes replacing "?::?" in the local database 230 with the 2001:3::db information. Step I then involves noting that the packet can then be routed or forwarded directly to the correct machine without the need to visit the intermediary segments 2001:4::db and 2001:2::db along the path. The packet in step J can then more efficiently reach its destination container7 238 at address fd00::7.

Once the mapping is complete, deficiencies can be experienced for later communication between containers. The process allows another container (e.g., container2 228 on machine1 210) to then contact container7 238 transparently by only contacting the local database at s1 230 with the other databases being bypassed upon a successful look-up in s1 230. When container2 228 wants to now contact container7 235, container2 can leverage the previously-installed machine-local mapping. Containers in rack1 206 can leverage the rack-local mapping as well. Similarly, if another container in rack1 206 were to contact container7 238, it would only go to its local database (where there would be a look-up miss) and then to the rack-local database 236 (where there would be a hit), without going to the global database. Thus, later attempts at communications between containers on different machines can be much more efficient after the process is performed.

The steps outlined above ensure that the locator mapping is propagated back to the rack and machine-local databases, thus allowing further look ups by containers from the same machine or same rack be achieved without going through the global database, which thus reduces latency.

Entries in the respective databases can include a timing component regarding when the entry was made as well as other data. For example, each time an entry is accessed, data can be stored, such as data about the originating container or the destination container, or other performance data can be tracked.

Expiration of entries in the databases can be triggered by a combination of one or more mechanisms. For example, a passive approach can include a time-to-live (TTL) timer, at the expiration of which the entry is removed. In an active approach, upon reaching a machine with a stale mapping, which can mean that the virtual machine is not on that physical machine anymore because it's been migrated or for some other reason, an ICMP (Internet Control Message Protocol) destination unreachable signal is generated by the virtual router and that machine, with segments (s1, s1, p, v), so as to invalidate the mapping in s1 and s2. If the machine has been shut off, the ICMP packet can be generated by the corresponding top-of-rack router 204, 205 instead. Thus, corrections to the database mapping records can also be made.

The proposed approach allows for in-band discovery of services, and in-band caching of locator mappings close to the requesting and points. Additionally, the caches (either in a machine itself or in the top-of-rack switch) can be used to detect which remote services are often accessed by containers deployed in the rack and to optimize deployment by starting these remote services locally.

Figure 6:
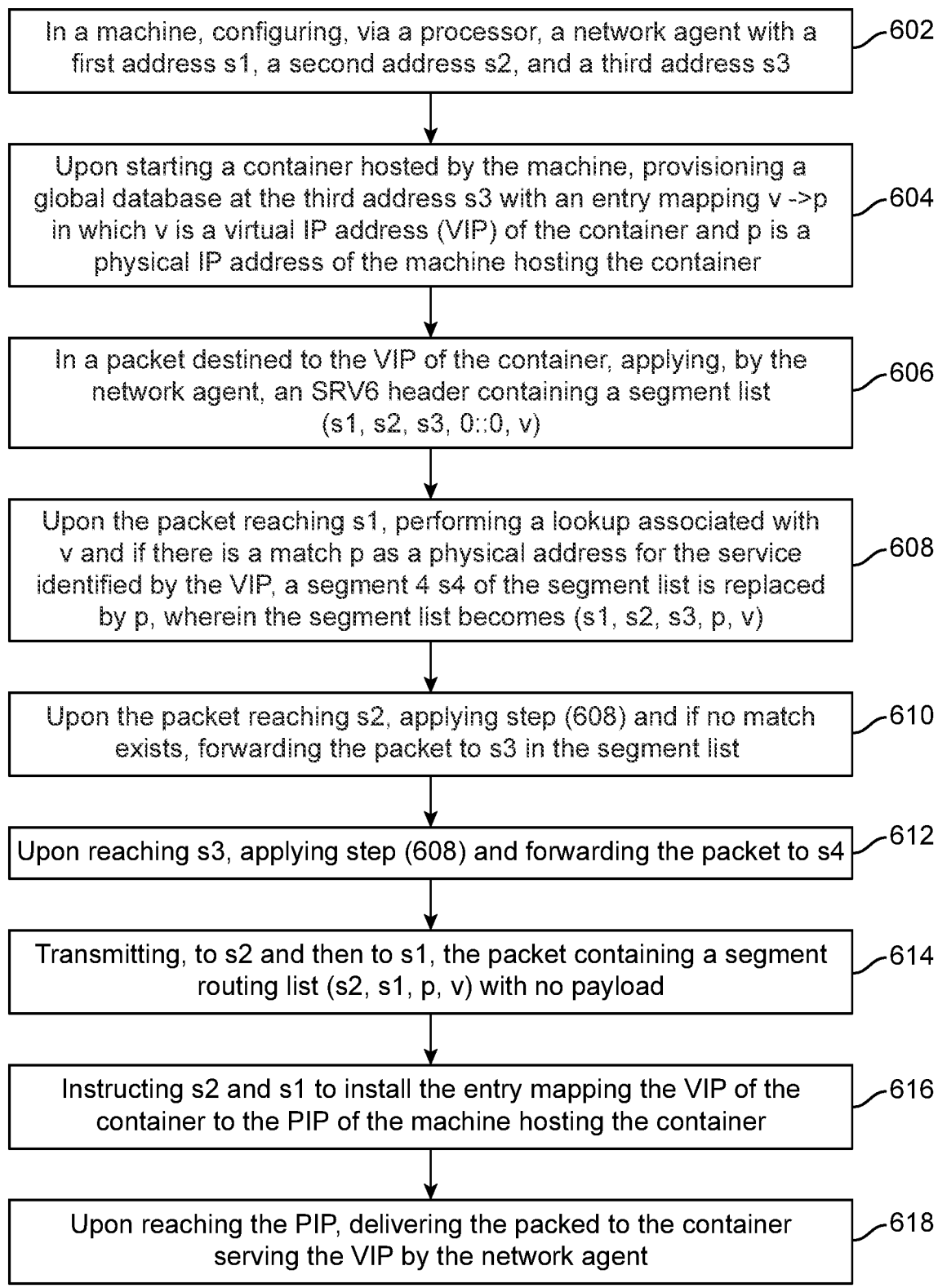
FIG. 6 illustrates method embodiment.

FIG. 6 illustrates a method aspect of this disclosure. An example method of providing in-band container discovery includes in a machine, configuring, via a processor, a network agent with a first address s1, a second address s2, and a third address s3 (602), upon starting a container hosted by the machine, provisioning a global database at the third address s3 with an entry mapping v→p in which v is a virtual IP address (VIP) of the container and p is a physical IP address (PIP) of the machine hosting the container (604), in a packet destined to the VIP of the container, applying, by the network agent, a header containing a segment list (s1, s2, s3, 0::0, v), (606) upon the packet reaching s1, performing a lookup associated with v and if there is a match p as a physical address for the service identified by the VIP, a segment 4 s4 of the segment list is replaced by p, wherein the segment list becomes (s1, s2, s3, p, v), (608), upon the packet reaching s2, applying step (608) and, if no match exists, forwarding the packet to s3 in the segment list (610), upon reaching s3, applying step (608) and forwarding the packet to the s4 (612); and transmitting, to s2 and then to s1, the packet containing a segment routing list (s2, s1, p, v) with no payload (614), instructing s2 and s1 to install the entry mapping the VIP of the container to the PIP of the machine hosting the container (616). Upon reaching the PIP, the method can include delivering the packed to the container serving the VIP by the network agent (618). The header can be, in one example, an SRV6 header structure or some other structure. It is noted that the SRV6 header structure can be in "traversal order" as shown above or in the structure shown in the figures, such as is shown in connection with step F of FIG. 4. The figures show the SRV6 in the IETF (Internet Engineering Task Force) order in which segments are depicted in the order in which they appear in the header as standardized by the IETF, which is the reverse of the traversal order. Both orders are shown in the present application and either order may be used or other orders may be used as well to implement the ideas disclosed herein.

The first address s1 can be for a local discovery service corresponding to each machine, the second address s2 can be associated with a rack-local service corresponding to each machine and the third address s3 can correspond to a global discover service. The method allows lookups by containers from a same machine or same rack to be achieved without going to the global discovery service.

Service discovery is an important feature for container networks which currently relies on costly out of band mechanisms. The present disclosure represents a solution to such a problem by using segment routing to search for a service in a tree-based architecture similar to a DNS approach but directly at the network layer. In this scenario disclose, both the machine—local and rack—local databases can act as local caches while the data center global database is treated as a centralized repository containing all VIP→PIP records. It is generally better to run the local database as the data plane function directly in the virtual router, rather than in a separate container. Various embodiments can use different topologies, database, and so forth. Additionally, in the case where hardware is programmable, it could be possible to implement a rack local database directly as a hardware function in the top-of-rack router.

Figure 7:
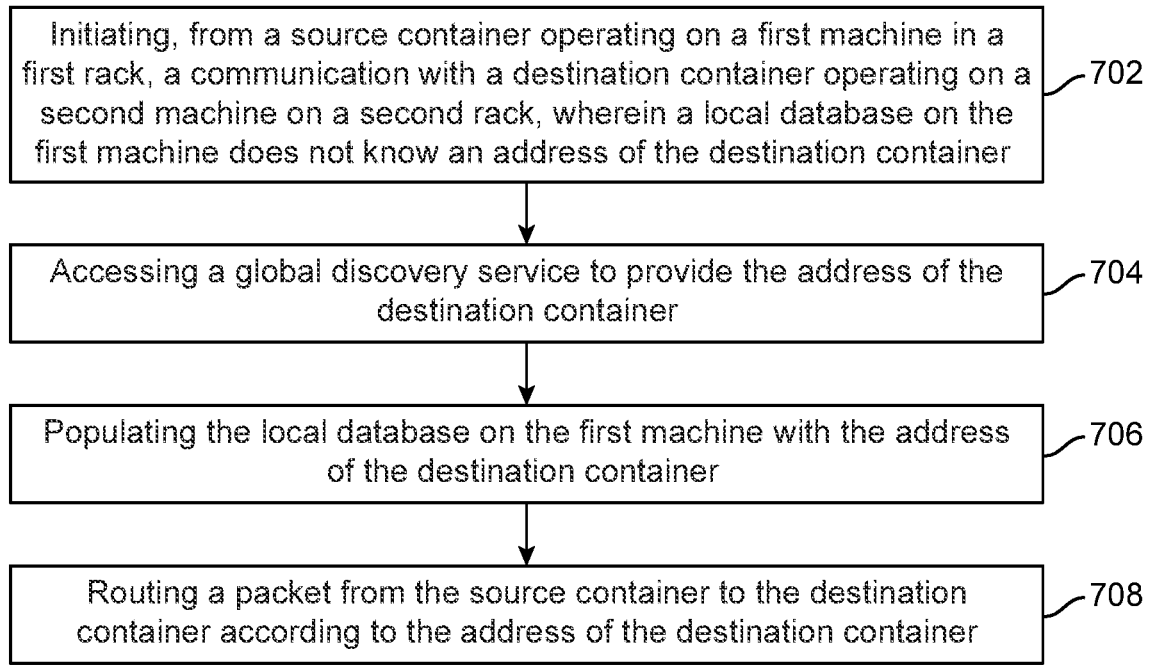
FIG. 7 illustrates another method embodiment.

FIG. 7 illustrates another method aspect of this disclosure. An example method includes initiating, from a source container operating on a first machine in a first rack, a communication with a destination container operating on a second machine on a second rack, wherein a local database on the first machine does not know an address of the destination container (702). The method includes accessing a global discovery service to provide the address of the destination container (704), populating the local database on the first machine with the address of the destination container (706) and routing a packet from the source container to the destination container according to the address of the destination container (708). After populating the local database on the first machine with the address of the destination container, the method can include initiating, from a second source container operating on the first machine in the first rack, a second communication with the destination container operating on the second machine on the second rack, accessing the local database on the first machine for the address of the destination container and routing a second packet from the second source container to the destination container utilizing the address of the destination container obtained from the local database and without accessing the global discovery service.

In another aspect, the method can include populating a rack level database on the first rack, configured on a third machine, with the address of the destination container. The method can also include initiating, from a third source container operating on the third machine on the first rack, a third communication with the destination container operating on the second machine on the second rack, accessing the rack level database on the third machine for the address of the destination container, and routing a third packet from the third source container to the destination container utilizing the address of the destination container obtained from the rack level database and without accessing the global discovery service.

In a further aspect, packets can also be generated upon a migration of a virtual machine or a container. When a container migrates, a packet can be generated and sent to each database at which an address of that container exists, such that updated address information can be provided or used to replace the outdated address information. Where the container is to be eliminated rather than migrated, a delete packet can be sent to eliminate the mapping in one or more databases. A default address location could be provided as well. Thus, a migration or cancelation of the origination and/or destination container can trigger a corrective action for one or more databases having address information for the respective container.

The approach disclosed herein can reduce latency relative to requiring access to the global discovery service for every communication between containers.

In another aspect, a method of providing in-band container discovery includes (1) in a machine, configuring, via a processor, a network agent with a first address s1, a second address s2, and a third address s3, (2) upon starting a container hosted by the machine, provisioning a global database at the third address s3 with an entry mapping v→p in which v is a virtual IP address (VIP) of the container and p is a physical IP address (PIP) of the machine hosting the container, (3) in a packet destined to the VIP of the container, applying, by the network agent, a header containing a segment list (s1, s2, s3, 0::0, v), (4) upon the packet reaching the first address s1, performing a lookup associated with v and if there is a match p as a physical address for a service identified by the VIP, a segment 4 s4 of the segment list is replaced by p, wherein the segment list becomes (s1, s2, s3, p, v), (5) upon the packet reaching the second address s2, applying step (4) and if no match exists, forwarding the packet to the third address s3 in the segment list, (6) upon reaching the third address s3, applying step (4) and forwarding the packet to the segment 4 s4, (7) transmitting, to the second address s2 and then to the first address s1, the packet containing a segment routing list (s2, s1, p, v) with no payload, instructing the second address s2 and the first address s1 to install an entry mapping the VIP of the container to the PIP of the machine hosting the container and (8) upon reaching the PIP, delivering the packet to the container serving the VIP by the network agent.

The first address s1 can be for a local discovery service corresponding to each machine, the second address s2 is associated with a rack-local service corresponding to each machine and the third address s3 corresponds to a global discovery service. The packet can be destined to the VIP of the container is from a source container and wherein the method further comprises allowing lookups by containers from a same machine as the source container or a same rack as the source container to be achieved without going to the global discovery service. The method can reduce latency relative to a method requiring access to a global discovery service. In one aspect, the header can be a SRV6 header. Upon cancellation or migration of the container, the method can include triggering a corrective action providing updated mapping data to one or more of the first address s1, the second address s2, and the third address s3.

A system aspect can include a processor and a computer-readable storage medium having stored therein instructions. When the instructions are executed by the processor, the instructions cause the processor to perform operations including (1) in a machine, configuring, via a processor, a network agent with a first address s1, a second address s2, and a third address s3, (2) upon starting a container hosted by the machine, provisioning a global database at the third address s3 with an entry mapping v→p in which v is a virtual IP address (VIP) of the container and p is a physical IP address (PIP) of the machine hosting the container, (3) in a packet destined to the VIP of the container, applying, by the network agent, a header containing a segment list (s1, s2, s3, 0::0, v), (4) upon the packet reaching the first address s1, performing a lookup associated with v and if there is a match p as a physical address for a service identified by the VIP, a segment 4 s4 of the segment list is replaced by p, wherein the segment list becomes (s1, s2, s3, p, v), (5) upon the packet reaching the second address s2, applying step (4) and if no match exists, forwarding the packet to the third address s3 in the segment list, (6) upon reaching the third address s3, applying step (4) and forwarding the packet to the segment 4 s4, (7) transmitting, to the second address s2 and then to the first address s1, the packet containing a segment routing list (s2, s1, p, v) with no payload, instructing the second address s2 and the first address s1 to install the entry mapping the VIP of the container to the PIP of the machine hosting the container and (8) upon reaching the PIP, delivering the packet to the container serving the VIP by the network agent.

In yet another aspect, a method can include initiating, from a source container operating on a first machine in a first rack, a communication with a destination container operating on a second machine on a second rack, wherein a local database on the first machine does not know an address of the destination container, accessing a global discovery service to provide the address of the destination container, populating the local database on the first machine with the address of the destination container and routing a packet from the source container to the destination container according to the address of the destination container.

The method can further include, after populating the local database on the first machine with the address of the destination container: initiating, from a second source container operating on the first machine in the first rack, a second communication with the destination container operating on the second machine on the second rack, accessing the local database on the first machine for the address of the destination container and routing a second packet from the second source container to the destination container utilizing the address of the destination container obtained from the local database and without accessing the global discovery service.

The method can further include populating a rack level database on the first rack, configured on a third machine, with the address of the destination container. The method can also further include initiating, from a third source container operating on the third machine on the first rack, a third communication with the destination container operating on the second machine on the second rack, accessing the rack level database on the third machine for the address of the destination container and routing a third packet from the third source container to the destination container utilizing the address of the destination container obtained from the rack level database and without accessing the global discovery service.

A migration or cancelation of the destination container can trigger a corrective action for one or more databases having address information for the destination container. The one or more databases can include the local database. The corrective action can include providing a new address of the container after migration to the one or more databases. The corrective action can also include providing a default address after cancellation of the destination container to the one or more databases.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, servers, network devices and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

We claim:

1. A method of providing in-band container discovery, the method comprising:
    (1) in a machine, configuring, via a processor, a network agent with a first address s1, a second address s2, and a third address s3;
    (2) upon starting a container hosted by the machine, provisioning a global database at the third address s3 with an entry mapping v→p in which v is a virtual IP address (VIP) of the container and p is a physical IP address (PIP) of the machine hosting the container;
    (3) in a packet destined to the VIP of the container, applying, by the network agent, a header containing a segment list (s1, s2, s3, 0::0, v);
    (4) upon the packet reaching the first address s1, performing a lookup associated with v and if there is a match p as a physical address for a service identified by the VIP, a segment 4 s4 of the segment list is replaced by p, wherein the segment list becomes (s1, s2, s3, p, v);
    (5) upon the packet reaching the second address s2, applying step (4) and if no match exists, forwarding the packet to the third address s3 in the segment list;
    (6) upon reaching the third address s3, applying step (4) and forwarding the packet to the segment 4 s4;
    (7) transmitting, to the second address s2 and then to the first address s1, the packet containing a segment routing list (s2, s1, p, v) with no payload, instructing the second address s2 and the first address s1 to install an entry mapping the VIP of the container to the PIP of the machine hosting the container; and
    (8) upon reaching the PIP, delivering the packet to the container serving the VIP by the network agent.

2. The method of claim 1, wherein the first address s1 is for a local discovery service corresponding to each machine, the second address s2 is associated with a rack-local service corresponding to each machine and the third address s3 corresponds to a global discovery service.

3. The method of claim 2, wherein the packet destined to the VIP of the container is from a source container and wherein the method further comprises allowing lookups by containers from a same machine as the source container or a same rack as the source container to be achieved without going to the global discovery service.

4. The method of claim 2, wherein the method reduces latency relative to a method requiring access to a global discovery service.

5. The method of claim 1, wherein the header comprises a SRV6 header.

6. The method of claim 1, wherein upon cancellation or migration of the container, triggering a corrective action providing updated mapping data to one or more of the first address s1, the second address s2, and the third address s3.

7. A system comprising:
    a processor; and
    a computer-readable storage medium having stored therein instructions which, when executed by the processor, cause the processor to perform operations comprising:
    (1) in a machine, configuring, via a processor, a network agent with a first address s1, a second address s2, and a third address s3;
    (2) upon starting a container hosted by the machine, provisioning a global database at the third address s3 with an entry mapping v→p in which v is a virtual IP address (VIP) of the container and p is a physical IP address (PIP) of the machine hosting the container;
    (3) in a packet destined to the VIP of the container, applying, by the network agent, a header containing a segment list (s1, s2, s3, 0::0, v);
    (4) upon the packet reaching the first address s1, performing a lookup associated with v and if there is a match p as a physical address for a service identified by the VIP, a segment 4 s4 of the segment list is replaced by p, wherein the segment list becomes (s1, s2, s3, p, v);
    (5) upon the packet reaching the second address s2, applying step (4) and if no match exists, forwarding the packet to the third address s3 in the segment list;
    (6) upon reaching the third address s3, applying step (4) and forwarding the packet to the segment 4 s4;
    (7) transmitting, to the second address s2 and then to the first address s1, the packet containing a segment routing list (s2, s1, p, v) with no payload, instructing the second address s2 and the first address s1 to install the entry mapping the VIP of the container to the PIP of the machine hosting the container; and
    (8) upon reaching the PIP, delivering the packet to the container serving the VIP by the network agent.

8. The system of claim 7, wherein the first address s1 is for a local discovery service corresponding to each machine, the second address s2 is associated with a rack-local service corresponding to each machine and the third address s3 corresponds to a global discovery service.

9. The system of claim 8, wherein the system allows lookups by containers from a same machine or a same rack to be achieved without going to the global discovery service.

10. The system of claim 7, wherein the system reduces latency relative to requiring access to a global discovery service.

11. The system of claim 1, wherein the computer-readable storage medium stores further instructions which, when executed by the processor, cause the processor to perform operations comprising:
    upon cancellation or migration of the container, triggering a corrective action providing updated mapping data to one or more of the first address s1, the second address s2, and the third address s3.

12. A method comprising:
    initiating, from a source container operating on a first machine in a first rack, a communication with a destination container operating on a second machine on a second rack, wherein a local database on the first machine does not know an address of the destination container;
    accessing a global discovery service to provide the address of the destination container;
    populating the local database on the first machine with the address of the destination container; and routing a packet from the source container to the destination container according to the address of the destination container.

13. The method of claim 12, further comprising, after populating the local database on the first machine with the address of the destination container:
  initiating, from a second source container operating on the first machine in the first rack, a second communication with the destination container operating on the second machine on the second rack;
  accessing the local database on the first machine for the address of the destination container; and
  routing a second packet from the second source container to the destination container utilizing the address of the destination container obtained from the local database and without accessing the global discovery service.

14. The method of claim 13, further comprising:
  populating a rack level database on the first rack, configured on a third machine, with the address of the destination container.

15. The method of claim 14, further comprising:
  initiating, from a third source container operating on the third machine on the first rack, a third communication with the destination container operating on the second machine on the second rack;
  accessing the rack level database on the third machine for the address of the destination container; and
  routing a third packet from the third source container to the destination container utilizing the address of the destination container obtained from the rack level database and without accessing the global discovery service.

16. The method of claim 13, wherein the method reduces latency relative to requiring access to the global discovery service for every communication between containers.

17. The method of claim 12, wherein a migration or cancelation of the destination container triggers a corrective action for one or more databases having address information for the destination container.

18. The method of claim 17, wherein the one or more databases comprises the local database.

19. The method of claim 17, wherein the corrective action comprises providing a new address of the container after migration to the one or more databases.

20. The method of claim 17, wherein the corrective action comprises providing a default address after cancellation of the destination container to the one or more databases.

* * * * *